US011198457B2

(12) United States Patent
Wike et al.

(10) Patent No.: US 11,198,457 B2
(45) Date of Patent: Dec. 14, 2021

(54) RAILWAY TRUCK ASSEMBLY HAVING FRICTION ASSIST SIDE BEARINGS

(71) Applicant: Amsted Rail Company, Inc., Chicago, IL (US)

(72) Inventors: Paul Steven Wike, St. Louis, MO (US); Igor Aleynikov, St. Louis, MO (US); Jared Doerr, Wright City, MO (US); Tom Petrunich, Troy, IL (US)

(73) Assignee: Amsted Rail Company, Inc., Chicago, IL (US)

( * ) Notice: Subject to any disclaimer, the term of this patent is extended or adjusted under 35 U.S.C. 154(b) by 328 days.

(21) Appl. No.: 16/391,558

(22) Filed: Apr. 23, 2019

(65) Prior Publication Data

US 2019/0367051 A1    Dec. 5, 2019

Related U.S. Application Data

(60) Provisional application No. 62/663,755, filed on Apr. 27, 2018.

(51) Int. Cl.
*B61F 5/14* (2006.01)
*B61F 5/06* (2006.01)
*B61F 5/12* (2006.01)

(52) U.S. Cl.
CPC .......... *B61F 5/14* (2013.01); *B61F 5/06* (2013.01); *B61F 5/122* (2013.01)

(58) Field of Classification Search
CPC .... B61F 5/122; B61F 5/06; B61F 5/00; B61F 5/02; B61F 5/04; B61F 5/12; B61F 5/14; B61F 5/16; B61F 5/20; B61F 5/24; B61F 5/245; B61F 5/34; B61F 5/142; B61F 5/52

USPC ..... 105/198.4, 198.2–198.5, 199.2, 200–203
See application file for complete search history.

(56) References Cited

U.S. PATENT DOCUMENTS

| 1,808,839 | A | * | 6/1931 | Davis | B61F 5/14 |
| | | | | | 384/423 |
| 2,594,462 | A | * | 4/1952 | Lehman | B61F 5/122 |
| | | | | | 267/213 |
| 2,631,841 | A | * | 3/1953 | Tillou | F16F 3/06 |
| | | | | | 267/134 |
| 3,730,104 | A | | 5/1973 | Hood, II | |
| 3,748,001 | A | | 7/1973 | Neumann | |
| 3,762,338 | A | | 10/1973 | Dwyer | |

(Continued)

FOREIGN PATENT DOCUMENTS

| WO | 2007096655 | 8/2007 |
| WO | WO 2007/096655 | 8/2007 |

(Continued)

OTHER PUBLICATIONS

Notification of Transmittal of the International Search Report and the Written Opinion for PCT/US2019/028649, dated Jul. 12, 2019.

*Primary Examiner* — Zachary L Kuhfuss
*Assistant Examiner* — Cheng Lin
(74) *Attorney, Agent, or Firm* — The Small Patent Law Group LLC; Joseph M. Butscher

(57) ABSTRACT

A friction assist side bearing assembly for a truck assembly of a rail vehicle includes a first friction member, a second friction member that opposes the first friction member, and a cap coupled to the first friction member and the second friction member. The cap is configured to contact a portion of a car body coupled to the truck assembly.

22 Claims, 6 Drawing Sheets

(56) References Cited

U.S. PATENT DOCUMENTS

| | | | |
|---|---|---|---|
| 3,762,339 | A | 10/1973 | Dwyer |
| 3,897,737 | A | 8/1975 | Davis |
| 4,130,066 | A | 12/1978 | Mulcahy |
| 4,434,720 | A | 3/1984 | Mulcahy |
| 4,715,290 | A | 12/1987 | Hood, II |
| 5,046,866 | A | 9/1991 | Mulcahy |
| 5,086,707 | A * | 2/1992 | Spencer .................. F16F 7/00 105/199.3 |
| 5,601,031 | A | 2/1997 | Carlson |
| 5,806,435 | A * | 9/1998 | Pitchford .................. B61F 5/14 105/199.3 |
| 6,644,214 | B1 | 11/2003 | Schorr |
| 7,121,212 | B2 | 10/2006 | Schorr |
| 7,174,837 | B2 | 2/2007 | Berg |
| 7,527,003 | B1 | 5/2009 | Schorr |
| 7,527,131 | B1 | 5/2009 | Wike |
| 7,546,807 | B2 | 6/2009 | Johnstone |
| 7,549,379 | B2 | 6/2009 | Monaco |
| 7,802,524 | B1 | 9/2010 | Gregar |
| 8,136,457 | B2 | 3/2012 | Sammartino |
| 8,201,504 | B2 | 6/2012 | O'Donnell |
| 8,356,558 | B2 | 1/2013 | Jeambey |
| 8,356,668 | B2 | 1/2013 | Dykslia |
| 8,590,460 | B2 | 11/2013 | Wike |
| 8,807,050 | B2 | 8/2014 | Aspengen |
| 8,939,087 | B2 | 1/2015 | McKisic |
| 8,967,052 | B2 | 3/2015 | Aspengren |
| 9,555,818 | B1 | 1/2017 | Wike |
| 2008/0173211 | A1 | 7/2008 | Kennedy |
| 2009/0308276 | A1 | 12/2009 | Aitken |
| 2012/0291660 | A1 * | 11/2012 | Aspengen ............... B61F 5/142 105/199.3 |

FOREIGN PATENT DOCUMENTS

| | | |
|---|---|---|
| WO | 2013090244 | 6/2013 |
| WO | WO 2013/090244 | 6/2013 |

\* cited by examiner

RAILWAY TRUCK ASSEMBLY HAVING FRICTION ASSIST SIDE BEARINGS

RELATED APPLICATIONS

This application relates to and claims priority benefits from U.S. Provisional Patent Application No. 62/663,355, filed Apr. 27, 2018, which is hereby incorporated by reference in its entirety.

FIELD OF THE DISCLOSURE

Embodiments of the present disclosure generally relate to truck assemblies for rail vehicles, such as rail cars, and, more particularly, to truck assemblies that include one or more friction assist side bearings, which are configured to stabilize the rail vehicles during travel.

BACKGROUND OF THE DISCLOSURE

Rail vehicles travel along railways, which have tracks that include rails. A rail vehicle includes one or more truck assemblies that support one or more car bodies. Each truck assembly includes two side frames and a bolster. Friction shoes are disposed between the bolster and the side frames. The friction shoes are configured to provide damping for suspension.

Freight rail vehicles often include a car body that carries bulk items, finished goods, and the like. The car body includes a center sill that extends under the car body from a first end to an opposite second end. Coupling systems are attached at the ends of the center sill. The coupling systems couple the rail vehicle to adjoining rail vehicles.

Bolsters are proximate to the ends of the center sill. The bolsters extend laterally across and under the car body. The bolsters extend and attach to the center sill from both sides. A center plate is centrally located on the car body bolster and positioned under the center sill.

A truck assembly typically has a centrally-located center plate or bowl. A center plate of the car body typically seats on the center plate or bowl of the truck assembly. A vertical load of the car body is transferred from the center plate to the center bowl or plate of the truck assembly. Typically, the truck assembly is configured to rotate about an interface between the center plates or bowls.

A typical truck assembly also includes side bearings, which are outboard of the center bowl. The side bearings are configured to limit roll of the car body and ensure that the car body does not overturn.

Known side bearings include a compression spring or elastic element to dampen a roll load of the car body against the truck assembly. The side bearings also dampen rotational inertia of the truck assembly, thereby adding stability to the rail vehicle.

However, known side bearings for rail vehicles may create inherent instabilities. While such instabilities have been present and known, they are more pronounced with increased freight capacity, increased operating speeds, and increased stringency of safety standards.

SUMMARY OF THE DISCLOSURE

A need exists for a side bearing that provides increased stability for a rail vehicle. Further, a need exists for a side bearing that provides increased control of roll, yaw, and the like.

With those needs in mind, certain embodiments of the present disclosure provide a friction assist side bearing assembly for a truck assembly of a rail vehicle. The friction assist side bearing assembly includes a first friction member, a second friction member that opposes the first friction member, and a cap coupled to the first friction member and the second friction member. The cap is configured to contact a portion of a car body coupled to the truck assembly. In at least one embodiment, the cap, the first friction member, and the second friction member are configured to move between an extended position and a compressed position to dampen forces between the car body and the truck assembly.

In at least one embodiment, the friction assist side bearing assembly also includes a spring bracket that retains a first spring and a second spring, and a friction base that couples to the spring bracket. The the first friction member and the second friction member are retained by the friction base, and the cap is frictionally coupled to the first friction member and the second friction member.

In at least one embodiment, the first spring and the second spring exert force between a top surface of a bolster and the spring bracket. The force exerted by the first spring and the second spring is distributed to the first friction member, the second friction member, and the cap. A fastener may secure the cap to the spring bracket and the friction base.

In at least one embodiment, the spring bracket includes a first lateral wing connected to an opposite second lateral wing by a central beam. The first lateral wing constrains the first spring, and the second lateral wing constrains the second spring. An angled protuberance extends upwardly from the central beam. The angled protuberance couples to the first friction member and the second friction member.

In at least one embodiment, the friction base includes opposed first and second side walls that connect to opposed first and second end walls that define a friction chamber. The first friction member and the second friction member are disposed within the friction chamber. The friction base is configured to be secured to a bolster of the truck assembly. As an example, the friction base is disposed over an angled protuberance of the spring bracket between a first lateral wing and a second lateral wing.

In at least one embodiment, each of the first friction member and the second friction member includes an upright outer wall, an upper interior wedge that downwardly and inwardly angles from a top edge of the upright outer wall, and a lower interior wedge that upwardly and inwardly angles from a lower edge of the upright outer wall. The upper interior wedge and the lower interior wedge may connect at a central band. The central bands of the first friction member and the second friction member face one another. The lower interior wedges of the first and second friction members bear against opposite angled ramps of an angled protuberance of a spring bracket.

In at least one embodiment, the cap includes a flat upper surface, opposed side ramps, and flat end walls. The cap wedges between the first friction member and the second friction member.

Certain embodiments of the present disclosure provide a damping method for a rail vehicle. The damping method includes providing a first friction member, providing a second friction member that opposes the first friction member, coupling a cap to the first friction member and the second friction member, and contacting a portion of a car body coupled to the truck assembly with the cap. In at least one embodiment, the method also includes moving the cap, the first friction member, and the second friction member between an extended position and a compressed position, and damping forces between the car body and the truck assembly by the moving. The coupling may include wedging the cap between the first friction member and the second friction member.

Certain embodiments of the present disclosure provide a truck assembly that is configured to travel along a track having rails. The truck assembly includes a first side frame, a second side frame, a bolster extending between the first side frame and the second side frame, a first wheel set coupled to the first side frame and the second side frame, a second wheel set coupled to the first side frame and the second side frame, a first friction assist side bearing assembly (as described herein) coupled to the bolster, and a second friction assist side bearing assembly (as described herein) coupled to the bolster.

DETAILED DESCRIPTION OF THE DISCLOSURE

The foregoing summary, as well as the following detailed description of certain embodiments, will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a friction assist side bearing having preload with sufficient friction damping to reduce rotational inertia of a truck assembly, thereby increasing stability to a rail vehicle. In at least one embodiment, the friction assist side bearing contacts a bolster with reduced compressive travel. When the friction assist side bearing contacts the bolster, a car body is able to roll about a solid friction assist side bearing. In at least one embodiment, the friction assist side bearing includes one or more angled wedges, which create friction damping in relation to both upward and downward movement.

The friction assist side bearing limits roll of a car body in relation to a center of gravity, thereby increasing stability of the car body on a truck assembly. The friction assist side bearing includes friction members that dampen (for example, reduce) car body roll. By damping the car body roll, a stroke of the friction assist side bearing may also be reduced. Limiting the roll of the car body maintains balance of wheelset loads, which allows for increased operating speed while maintaining safety standards and limiting wear.

Figure 1:
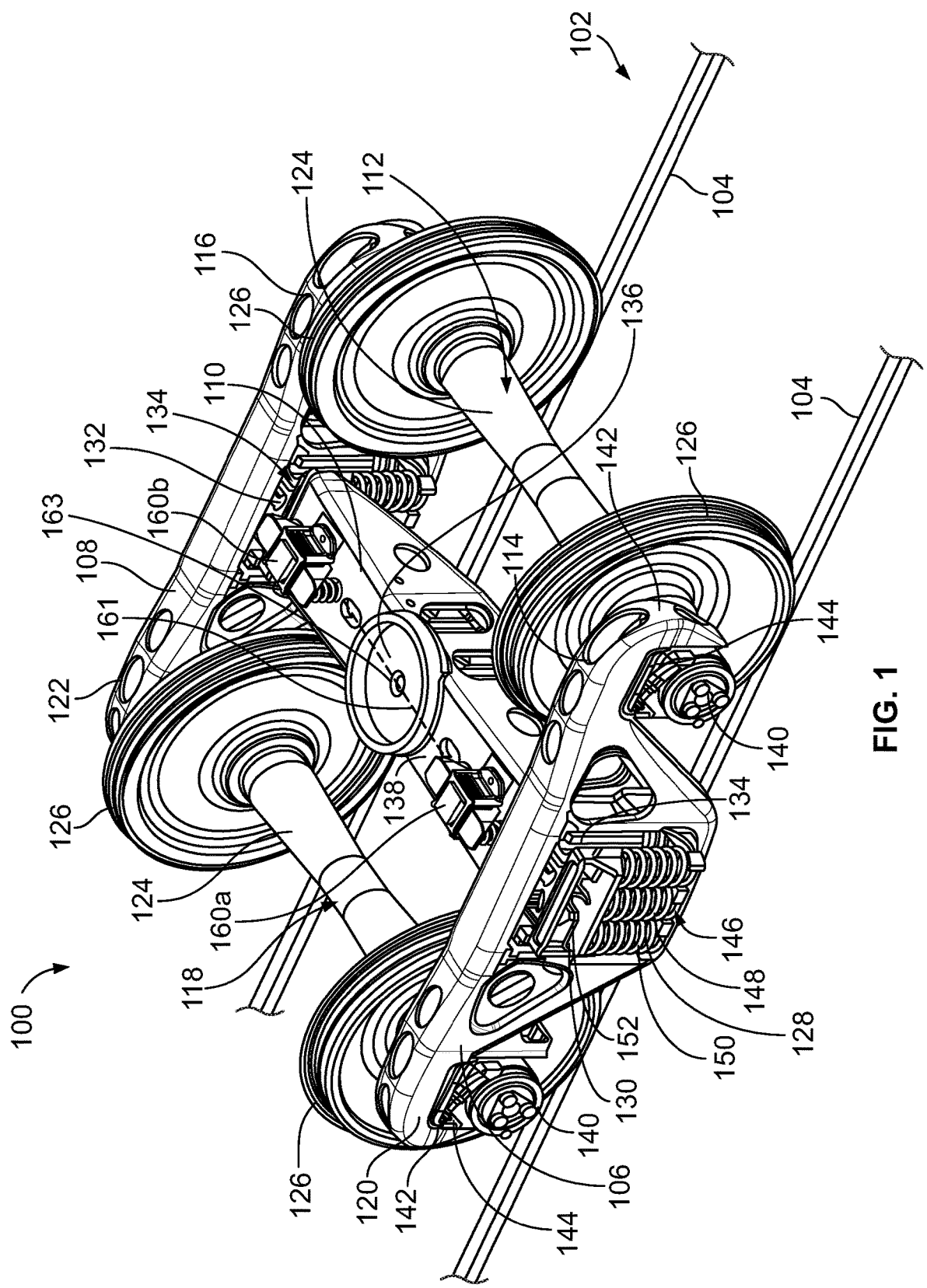
FIG. 1 illustrate a perspective top view of a truck assembly, according to an embodiment of the present disclosure.

FIG. 1 illustrate a perspective top view of a truck assembly 100, according to an embodiment of the present disclosure. The truck assembly 100 is configured to travel along a track 102 having rails 104. The truck assembly 100 includes a first side frame 106 and a second side frame 108, which are spaced apart from one another. A bolster 110 extends between the first side frame 106 and the second side frame 108, and couples the first side frame 106 to the second side frame 108.

A first wheel set 112 is rotatably coupled to first ends 114 and 116 of the first side frame 106 and the second side frame 108, respectively, and a second wheel set 118 is rotatably coupled to second ends 120 and 122 of the first side frame 106 and the second side frame 108, respectively. Each of the first and second wheel sets 112 and 118 includes an axle 124 connected to wheels 126. The wheels 126 are supported on the rails 104 and are configured to travel thereon as the axles 124 rotate in relation to the first side frame 106 and the second side frame 108.

The first and second side frames 106 and 108 includes damper systems 128. For example, the damper systems 128 include one or more springs, friction shoes, and the like that are configured to dampen forces exerted into and/or by the truck assembly 100 as the truck assembly 100 travels along the track 102.

The bolster 110 includes ends 130 and 132 (for example a first end 130 and an opposite second end 132), which extend through openings 134 of the side frames 106 and 108. The bolster 110 also includes a bolster center bowl 136 outwardly extending from an upper surface 138. As shown, the bolster center bowl 136 is centrally located on the upper surface 138 of the bolster 110 between the ends 130 and 132.

Ends of the axles 124 are rotatably retained by bearings 140, which are coupled to the side frames 106 and 108. In particular, the wheel sets 112 and 118 are coupled to the side frames 106 and 108 at pedestals 142 of the side frames 106 and 108. The pedestals 142 connect to bearing adapters 144 that connect to the bearings 140.

In at least one embodiment, the damping systems 128 include spring groups 146 supported within the openings 134 of the side frames 106 and 108. The spring groups 146 include load coils 148 and control coils 150. The load coils 148 support the bolster 110 at the ends 130 and 132. The control coils 150 support friction shoes 152.

A first friction assist side bearing assembly 160a is mounted on the top surface 138 of the bolster 110 between the bolster center bowl 136 and the end 130. A second friction assist side bearing assembly 160b is mounted on the top surface 138 of the bolster 110 between the bolster center bowl 136 and the end 132. The friction assist side bearing assembly 160a and the friction assist side bearing assembly 160b may be aligned along a central longitudinal plane 161 of the bolster 110 that passes through a center 163 of the bolster center bowl 136. Each friction assist side bearing assembly 160a and 160b may be spaced from the center 163 the same distance, but in opposite directions.

As described herein, the friction assist side bearing assemblies 160a and 160b are configured to limit roll of a car body supported by the truck assembly 100, thereby increasing the stability of the car body and the truck assembly 100, as well as a rail vehicle that includes the car body and the truck assembly 100. The friction assist side bearing assemblies 160a and 160b include friction members (such as wedges) that dampen car body roll.

When a rail vehicle including the truck assembly 100 and a car body supported on the truck assembly 100 travels along the track 102, perturbations of the track 102 are transferred into the rail vehicle in the form of displacement. Displacement of a center of gravity of the car body on the truck assembly 100 creates roll energy, which changes distribution of the weight of the car body and/or the truck assembly 100 on the wheelsets 112 and 118. The center of gravity of a rail vehicle is a point where a weight of the car body and lading react. The weight reacts about the center bowl 136 and the friction assist side bearing assemblies 160a and 160b, which dampen roll forces and prevent overturning.

The roll energy reacting on the friction assist side bearing assemblies 160a and 160b may be sufficient to instantly change the balance of the force through the wheelsets 112 and 118 to the rails 104. Vertical force due to tapering of the wheels 126 creates a vectored lateral force to balance the wheelsets 112 and 118 on the rail 104. When the roll energy changes the center of gravity position, the wheel loads change and the wheelsets 112 and 118 find a location on the rails 104 to balance the wheel forces. Such movement may create instability which limits speed, exceeds safety standards and increases wear.

Figure 2:
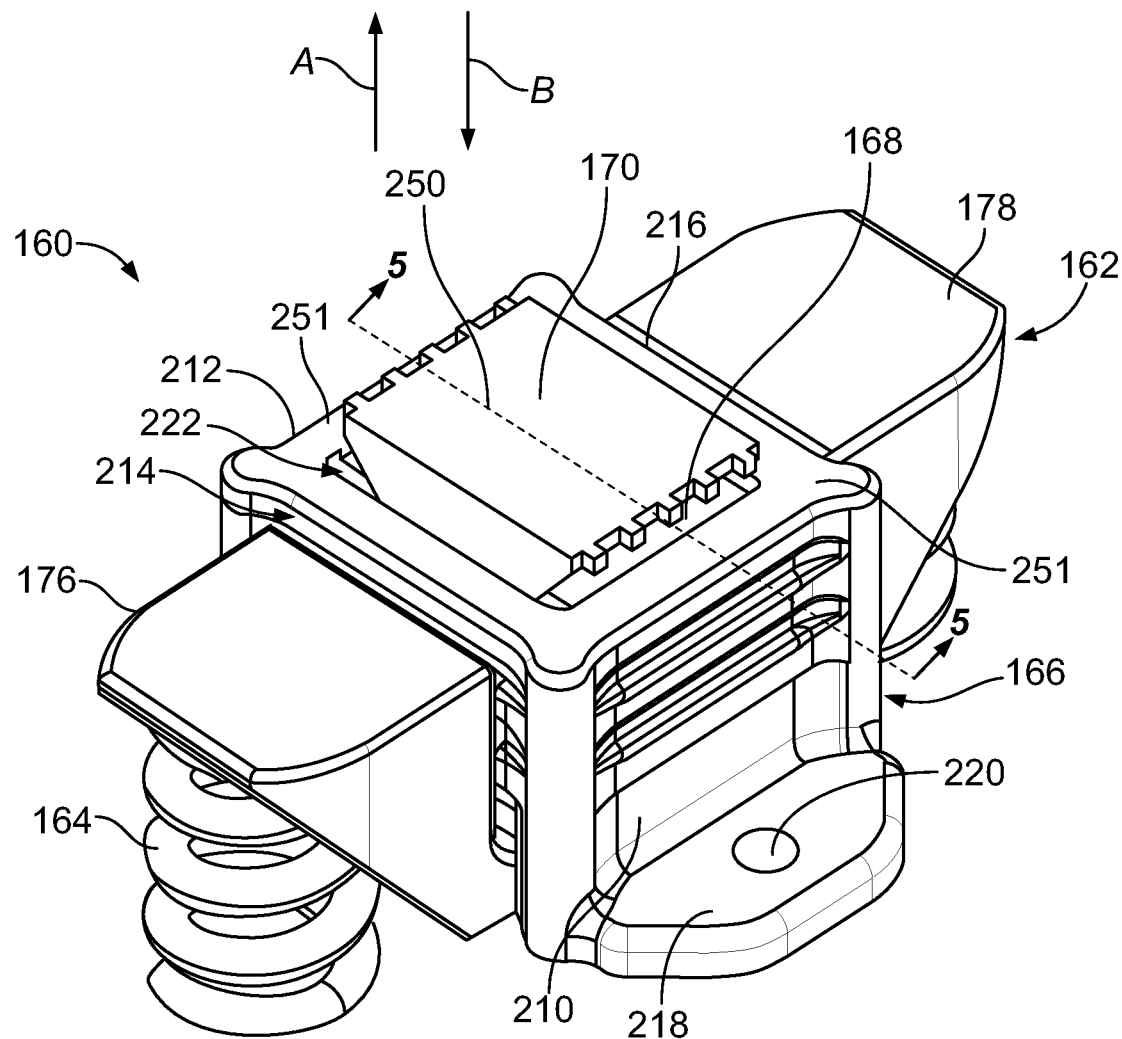
FIG. 2 illustrates a perspective top view of a friction assist side bearing assembly, according to an embodiment of the present disclosure.
Figure 3:
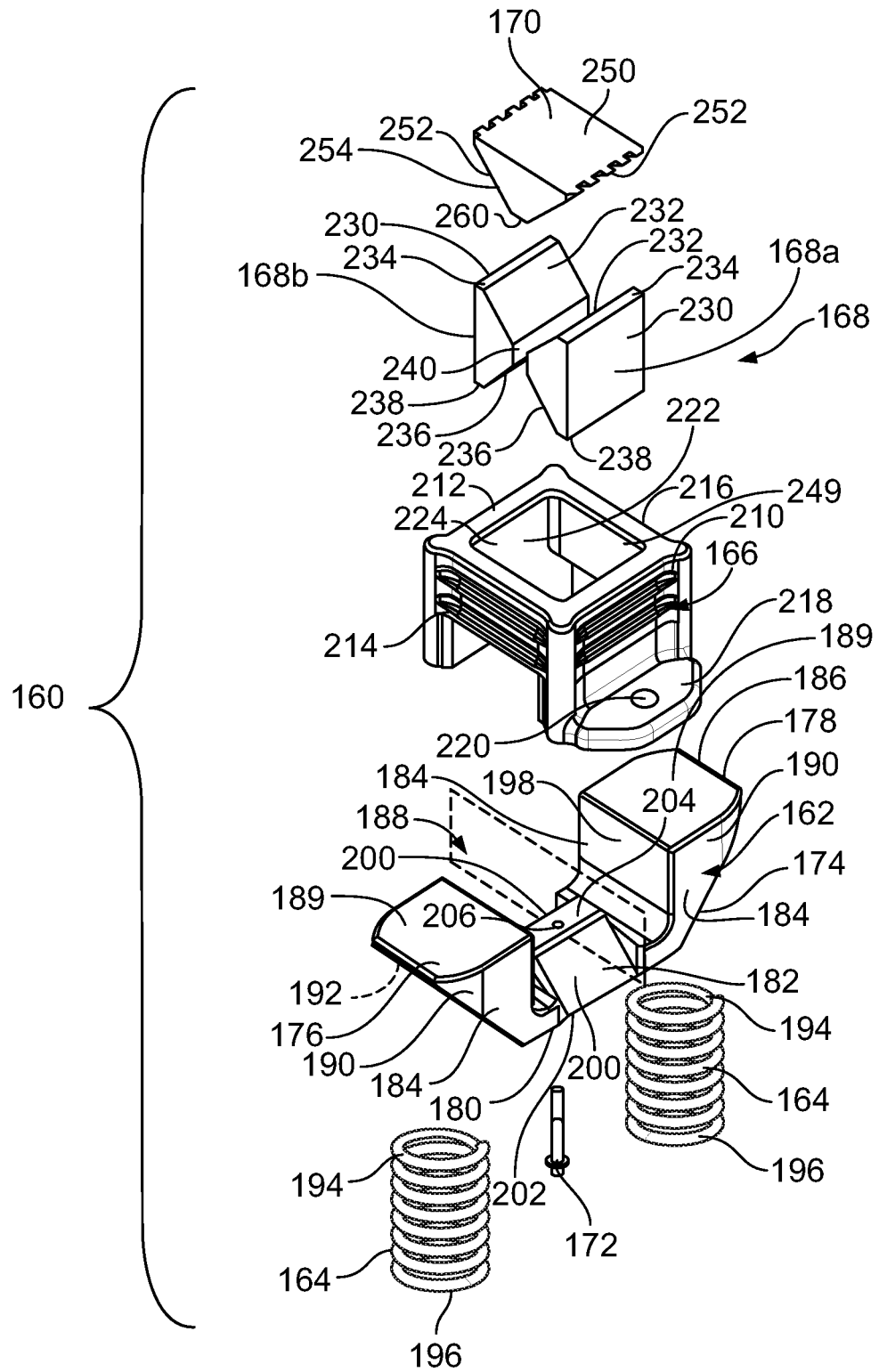
FIG. 3 illustrates a perspective top exploded view of the friction assist side bearing assembly.

FIG. 2 illustrates a perspective top view of a friction assist side bearing assembly 160, according to an embodiment of the present disclosure. FIG. 3 illustrates a perspective top exploded view of the friction assist side bearing assembly 160. Referring to FIGS. 1-3, the friction assist side bearing assemblies 160a and 160b shown in FIG. 1 are configured as the friction assist side bearing assembly 160 shown and described with respect to FIG. 1. The friction assist side bearing assembly 160 includes a spring bracket 162 that retains springs 164 (such as compression springs), a friction base 166 that couples to the spring bracket 162, one or more friction members 168 that are retained by the friction base 166, a cap 170 frictionally coupled to the friction members 168, and a fastener 172 that secures the cap 170 to the spring bracket 162 and the friction base 166.

The spring bracket 162 includes a bracket body 174 having a first lateral wing 176 connected to an opposite second lateral wing 178 by a central beam 180. An angled protuberance 182 extends upwardly from the central beam 180 (for example, the central beam 180 include the angled protuberance 182). Each lateral wing 176 and 178 includes an upright beam 184 upwardly extending from an end of the central beam 180. A lateral beam 186 outwardly extends from an upper end of the upright beam 184 away from a central lateral plane 188 of the spring bracket 162. Upper surfaces 189 of the lateral beams 186 may be flat. Side walls 190 extend on sides of the lateral wings 176 and 178 between the upright beam 184 and the lateral beam 186. A spring recess 192 is defined between a lower surface of the lateral beam 186, interior surfaces of the side walls 190, and an outboard surface of the upright beam 184. The spring recesses 192 are configured to retain the springs 164. For example, an upper surface 194 of each spring 164 abuts into the lower surface of the lateral beam, while a lower surface 196 abuts against the upper surface 138 of the bolster 110. The compression springs 164 are constrained in the spring recesses 192.

Inboard surfaces 198 of the upright beams 184 of the lateral wings 176 and 178 are spaced apart from one another. The angled protuberance 182 extends upwardly between the lower portions of the lateral wings 176 and 178.

The angled protuberance 182 includes inwardly angled ramps 200 that upwardly and inwardly angle towards one another from opposite lower edges 202. The angled ramps 200 connect to a central strap 204. A fastener through-hole 206 is formed through a center of the central strap 204.

The friction base 166 includes opposed first and second side walls 210 and 212 that connect to opposed first and second end walls 214 and 216. Bolster coupling flanges 218 outwardly extend from lower ends of the first and second side walls 210. Fasteners are used to secure the friction base 166 to the upper surface 138 of the bolster 110, such as through fasteners extending through through-holes 220.

A friction chamber 222 is defined by flat, upright interior surfaces 224 of the first and second side walls 210 and 212 and the first and second end walls 214 and 216.

The friction base 166 is disposed over the angled protuberance 182 of the spring bracket 162 between the first lateral wing 176 and the second lateral wing 178. For example, the end walls 214 and 216 may abut against or be proximate to the inboard surfaces 198 of the first and second lateral wings 176 and 178, while the bolster coupling flanges 218 extend away from the central beam 180 of the spring bracket 162. The angled protuberance 182 extends upwardly into the friction chamber 222.

As shown, the friction assist side bearing assembly 160 includes two opposed friction members 168a and 168b, which are retained within the friction chamber 222. Each friction member 168a and 168b includes a flat, upright outer wall 230 that abuts against the flat, upright interior surface 224 of a respective first or second side wall 210. The outer wall 230 connects to upper interior wedge 232 that downwardly and inwardly angles (that is, angles away from—not towards—the outer flat surface of the outer wall 230) from a top edge 234, and a lower interior wedge 236 that upwardly and inwardly angles (that is, angles away from—not towards—the outer flat surface of the outer wall 230) from a lower edge 238. The upper interior wedge 232 and the lower interior wedge 236 connect at a central band 240. The central bands 240 of the opposed friction members 168a and 168b face one another.

The cap 170 is configured to couple between the opposed friction members 168a and 168b and extend upwardly from a top opening 249 of the friction base 166. The top opening 249 provides a passage into the friction chamber 222.

The cap 170 includes a flat upper surface 250, opposed side ramp 252, and flat end walls 254. The cap 170 wedges between the opposed friction members 168a and 168b such that the inwardly and downwardly angled side ramps 252 bear against the upper interior wedges 232. An apex 260 where the side ramps 252 meet may be positioned between central bands 240 of the opposed friction members 168a and 168b. The lower interior wedges 236 of the opposed friction members 168a and 168b bear against opposite angled ramps 200 of the angled protuberance 182.

In at least one embodiment, the opposed friction members 168a and 168b and/or the cap 170 may be formed of an elastic material, such as rubber or flexible plastic. In at least one other embodiment, the opposed friction members 168a and 168b and/or the cap 170 may be formed of metal.

The fastener 172 (such as a threaded bolt or screw) secures the cap 170 to the spring bracket 162 and the friction base 166. In particular, the fastener 172 extends through the fastener through-hole 206 of the angled protuberance 182 and securely couples to the apex 260, which is between the opposed friction members 168a and 168b.

When the cap 170 is secured between the friction members 168a and 168b within the friction chamber 222 (as shown in FIG. 2), the angled, sloped surfaces of the friction members 168a and 168 exert an upward force into the cap 170, thereby disposing the flat upper surface 250 of the cap 170 above the upper surfaces 251 of the friction base 166. The flat upper surface 250 of the cap 170 is configured to abut against a lower surface of a car body. As such, the friction base 166 and the friction members 168a and 168b cooperate to force the cap 170 against the lower surface of the car body, thereby providing an upward damping force A into the car body. Further, as the car body exerts a downward force into the upper surface 250 of the cap 170, the friction base 166 recedes towards the bolster 110, thereby providing a downward damping force B. In at least one embodiment, the cap 170 may recede into the friction chamber 222 between the friction members 168a and 168, via the cooperating ramped, angled surfaces. As such, the opposed friction members 168a and 168 provide a resistive force into the cap 170, which therefore provides a downward damping force B into the car body. Accordingly, the friction assist side bearing assembly 160 provides both upward and downward damping in relation to the car body.

In at least one embodiment, the cap 170 is configured to move in relation to the opposed friction members 168a and 168 to provide damping. In at least one other embodiment, the cap 170 is securely fixed to the opposed friction members 168a and 168b to provide a solid damping member that moves along with the friction base 166 to provide damping.

The friction assist side bearing assemblies 160a and 160b (shown in FIG. 1) are mounted to the bolster 110 through the coupling flanges 218. The springs 164 exert vertical force between the top surface 138 of the bolster 110 and the spring bracket 162. The vertical force exerted by the springs 164 is distributed to the opposed friction members 168a and 168b, which provides damping, and finally to the cap 170, which is against a portion of a car body.

Figure 4:
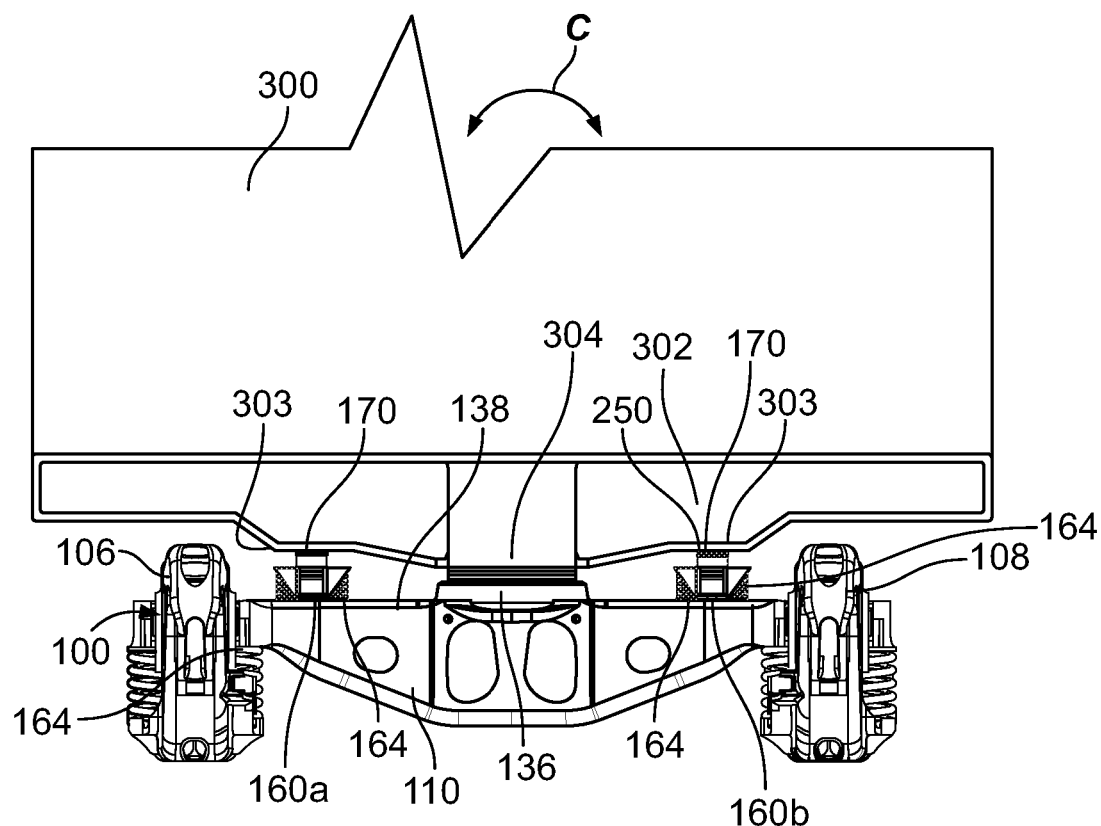
FIG. 4 is an end view of a car body secured to a truck assembly, according to an embodiment of the present disclosure.

FIG. 4 is an end view of a car body 300 secured to the truck assembly 100, according to an embodiment of the present disclosure. For clarity, the wheelsets are now shown in FIG. 4. A load path of the car body 300 extends through a car body bolster 302 to a body center plate 304, which transfers the load to the bolster center bowl 136 of the truck assembly 100. The friction assist side bearing assemblies 160a and 160b extend from the top surface 138 of the bolster 110 to the car body bolster 302, such that the upper surfaces 250 abut against lower surfaces 303 of the car body bolster 302.

The compression springs 164 preload the caps 170 against the lower surfaces 303 of the car body bolster 302. A wear plate and spacers coupled to the car body bolster 302 and/or the caps 170 may be used to adjust the height of caps 170, which in turn adjust the height and preload force of the compression springs 164. The preloaded force of the caps 170 against the car body bolster 302 (such as a wear plate of the car body bolster 302) provides frictional resistance as the truck assembly 100 turns about an interface between the bolster center bowl 136 and the body center plate 304. The preloaded force of the caps 170 against the car body bolster 302 also reduces roll of the car body 300 in the directions of arc C.

Referring to FIGS. 1-4, embodiments of the present disclosure provide the friction assist side bearing assembly 160 (such as 160a or 160b) for the truck assembly 100. The friction assist side bearing assembly 160 includes the first friction member 168a, the second friction member 168b that opposes the first friction member 168a, and the cap 170 is coupled to the first friction member 168a and the second friction member 168b. The cap 170 is configured to contact a portion of the car body 300 coupled to the truck assembly 100. The cap 170, the first friction member 168a, and the second friction member 168b are configured to move between an extended position and a compressed position to dampen forces between the car body 300 and the truck assembly 100.

Figure 5:
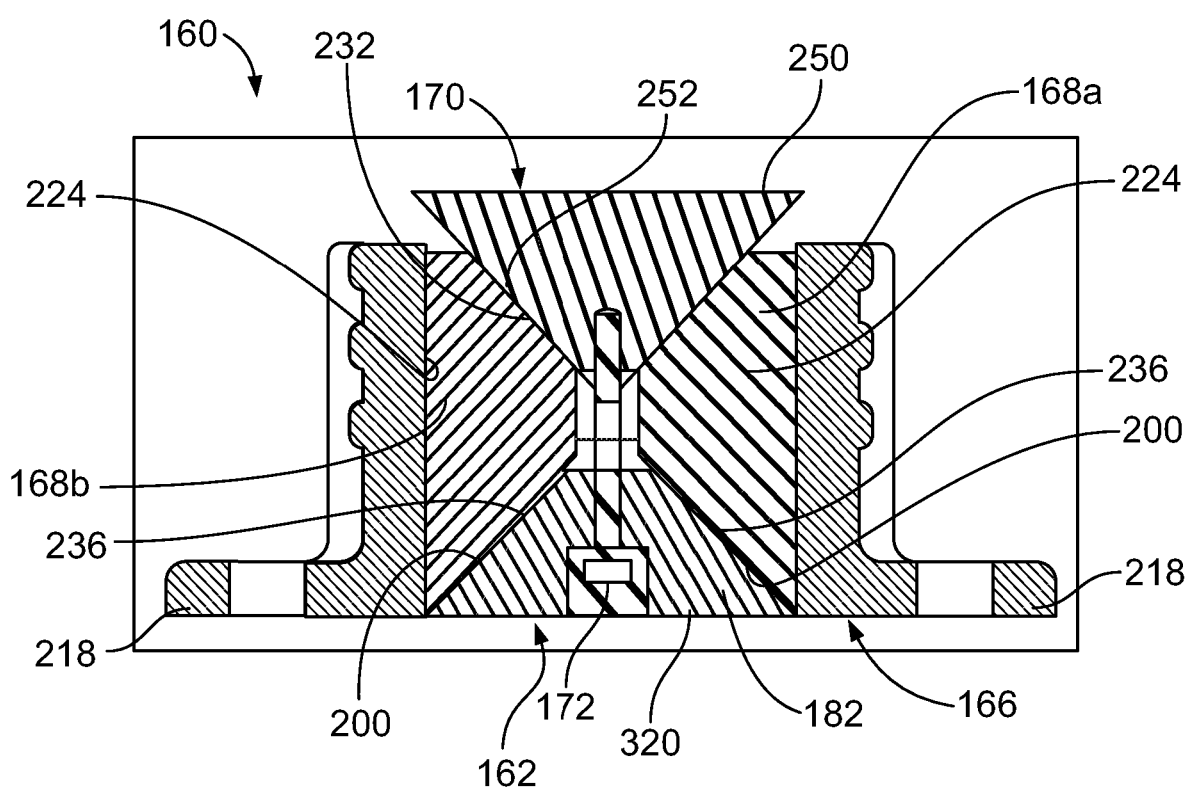
FIG. 5 illustrates a cross-sectional view of the friction assist side bearing assembly through line 5-5 in a compressed position.

FIG. 5 illustrates a cross-sectional view of the friction assist side bearing assembly 160 through line 5-5 in a compressed position. In the compressed position, a reduced or nonexistent gap exists between a bottom surface 320 of the spring bracket 162 at a preload height to the top surface 138 of the bolster 110 (shown in FIG. 1). The preload force of the spring bracket 162 acting on the angled surfaces including the angled ramps 200, the lower interior wedges 236, the angled side ramps 252, and the upper interior wedges 232 directs forces exerted into the opposed friction members 168a and 168b and the flat, upright interior surfaces 224 of the friction base 166.

Figure 6:
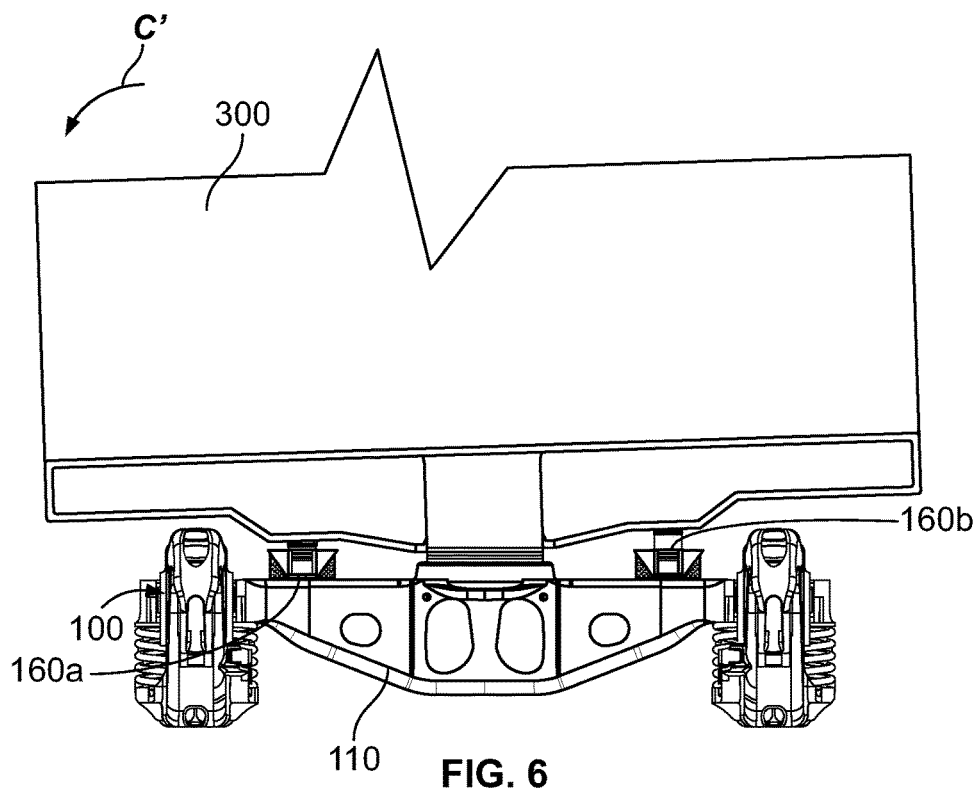
FIG. 6 is an end view of the car body rolling towards a side of the truck assembly.

FIG. 6 is an end view of the car body 300 rolling towards a side of the truck assembly 100. As the car body 300 rolls in the direction of arc C', the friction assist side bearing assembly 160a compresses (that is, the friction assist side bearing assembly 160a is in the compressed position), thereby damping the downwardly-directed rolling motion, while the friction assist side bearing assembly 160b extends (that is, the friction assist side bearing assembly 160b is in an extended position), thereby providing upwardly-directed damping. The friction assist side bearing assemblies 160 and 160b contact the bolster 110 with a reduced level of compressive travel (as compared to known side bearings). The opposed friction members 168a and 168b (shown in FIGS. 3 and 5, for example) provide a solid frictional damping member, which dampens rolling of the car body 300 in relation to the truck assembly 100.

Figure 7:
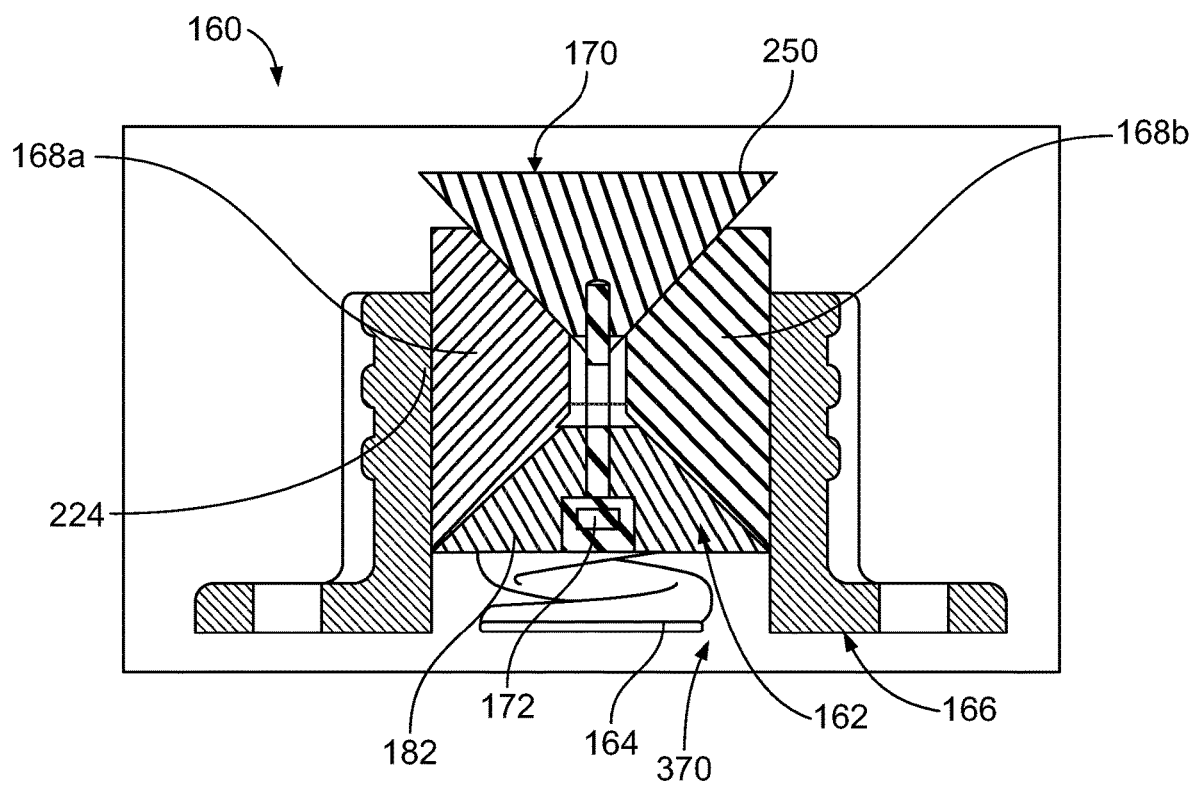
FIG. 7 illustrates a cross-sectional view of the friction assist side bearing assembly through line 5-5 in an extended position.

FIG. 7 illustrates a cross-sectional view of the friction assist side bearing assembly 160 through line 5-5 in an extended position. As shown, a gap 370 of increased height is defined between the friction base 166 and the top surface 138 of the bolster 110 (shown in FIG. 1) when the friction assist side bearing assembly 160 is in the extended position.

The friction assist side bearing assembly 160 extends via the spring force exerted by the springs 164. As the friction assist side bearing assembly 160 extends, the force of compression springs is dampened by the preload force of the spring bracket 162 acting on the angled surfaces, thereby directing the force into the opposed friction members 168a and 168b and the flat surfaces 224. The forces between the friction base 166 and the opposed friction members 168a and 168b creates friction that resists the movement. Referring to FIGS. 6 and 7, when the car body 300 rolls back, the car body bolster 302 presses the top flat surface 250 of the cap 170, and the damping between the opposed friction members 168a and 168b and the friction base 166 is again engaged to dampen the energy of the roll of the car body 300 in relation to the truck assembly 100.

During an extreme car body roll, in which the car body 300 may be susceptible to uncoupling from a standard, known side bearing, the side friction assist side bearing assemblies 160a and 160b of embodiments of the present disclosure provide constant contact with the car body 300 and the bolster 110. Unlike standard, known side bearings, the flat upper surfaces 250 of the caps 170 maintain contact with the car body 300, even in extreme car body roll cases.

Figure 8:
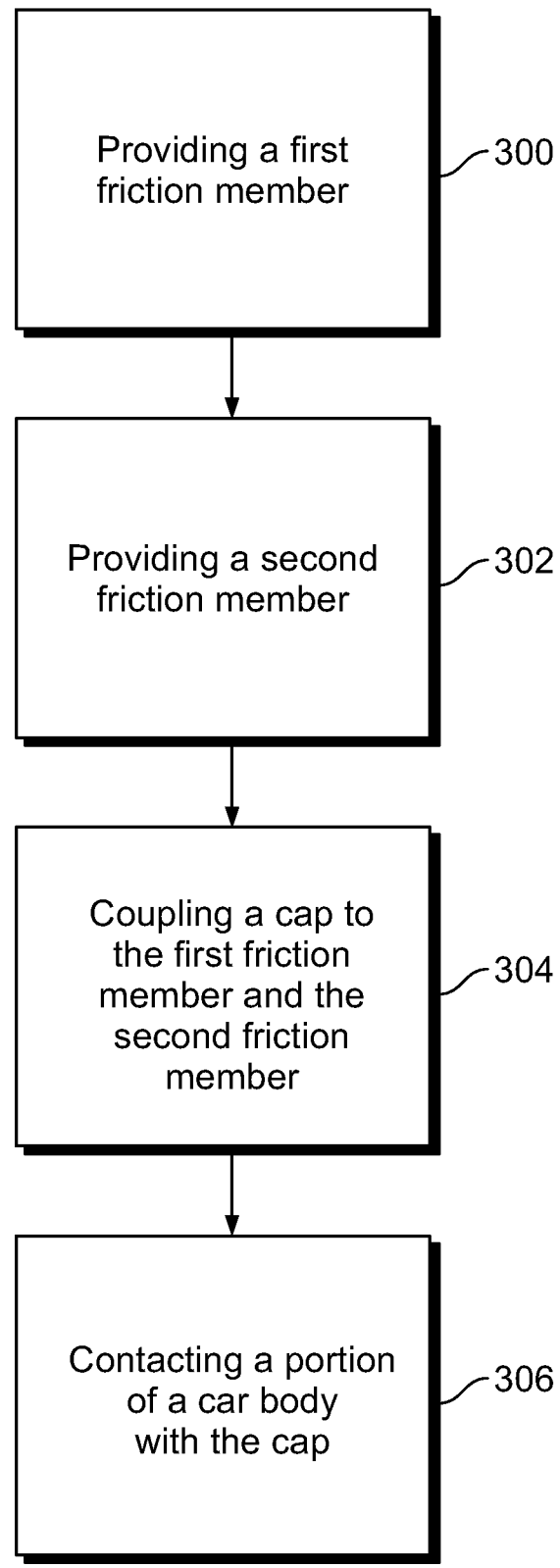
FIG. 8 illustrates a flow chart of a damping method for a rail vehicle, according to an embodiment of the present disclosure.

FIG. 8 illustrates a flow chart of a damping method for a rail vehicle, according to an embodiment of the present disclosure. The damping method includes providing (300) a first friction member, providing (302) a second friction member that opposes the first friction member, coupling (304) a cap to the first friction member and the second friction member, and contacting (306) a portion of a car body coupled to the truck assembly with the cap. In at least one embodiment, the method also includes moving the cap, the first friction member, and the second friction member between an extended position and a compressed position, and damping forces between the car body and the truck assembly by the moving. The coupling may include wedging the cap between the first friction member and the second friction member.

As described herein, embodiments of the present disclosure provide a friction assist side bearing assembly that provides increased stability for a rail vehicle. Further, the friction assist side bearing assembly provides increased control of roll, yaw, and the like.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A friction assist side bearing assembly for a truck assembly of a rail vehicle, the friction assist side bearing assembly comprising:
    a spring bracket that retains a first spring and a second spring;
    a friction base that couples to the spring bracket;
    a first friction member retained by the friction base;
    a second friction member that opposes the first friction member, wherein the second friction member is retained by the friction base;
    a cap coupled to the first friction member and the second friction member, wherein the cap is configured to contact a portion of a car body coupled to the truck assembly, wherein the cap is frictionally coupled to the first friction member and the second friction member; and
    a fastener that secures the cap to the spring bracket and the friction base.

2. The friction assist side bearing assembly of claim 1, wherein the cap, the first friction member, and the second friction member are configured to move between an extended position and a compressed position to dampen forces between the car body and the truck assembly.

3. The friction assist side bearing assembly of claim 1, wherein the first spring and the second spring exert force between a top surface of a bolster and the spring bracket, wherein the force exerted by the first spring and the second spring is distributed to the first friction member, the second friction member, and the cap.

4. The friction assist side bearing assembly of claim 1, wherein the spring bracket comprises:
    a first lateral wing connected to an opposite second lateral wing by a central beam, wherein the first lateral wing constrains the first spring, and the second lateral wing constrains the second spring; and
    an angled protuberance extending upwardly from the central beam, wherein the angled protuberance couples to the first friction member and the second friction member.

5. The friction assist side bearing assembly of claim 1, wherein the friction base comprises opposed first and second side walls that connect to opposed first and second end walls that define a friction chamber, wherein the first friction member and the second friction member are disposed within the friction chamber, and wherein the friction base is configured to be secured to a bolster of the truck assembly.

6. The friction assist side bearing assembly of claim 1, wherein the friction base is disposed over an angled protuberance of the spring bracket between a first lateral wing and a second lateral wing.

7. The friction assist side bearing assembly of claim 1, wherein each of the first friction member and the second friction member comprises:
an upright outer wall;
an upper interior wedge that downwardly and inwardly angles from a top edge of the upright outer wall; and
a lower interior wedge that upwardly and inwardly angles from a lower edge of the upright outer wall.

8. The friction assist side bearing assembly of claim 7, wherein the upper interior wedge and the lower interior wedge connect at a central band, wherein the central bands of the first friction member and the second friction member face one another.

9. The friction assist side bearing assembly of claim 7, wherein the lower interior wedges of the first and second friction members bear against opposite angled ramps of an angled protuberance of a spring bracket.

10. The friction assist side bearing assembly of claim 1, wherein the cap comprises:
a flat upper surface;
opposed side ramps; and
flat end walls,
wherein the cap wedges between the first friction member and the second friction member.

11. A damping method for a rail vehicle, the damping method comprising:
retaining a first spring and a second spring by a spring bracket;
coupling a friction base to the spring bracket;
retaining a first friction member within the friction base;
retaining a second friction member that opposes the first friction member within the friction base; and
frictionally coupling a cap to the first friction member and the second friction member; and
contacting a portion of a car body coupled to the truck assembly with the cap.

12. The damping method of claim 11, further comprising:
moving the cap, the first friction member, and the second friction member between an extended position and a compressed position; and
damping forces between the car body and the truck assembly by the moving.

13. The damping method of claim 11, wherein the coupling comprises wedging the cap between the first friction member and the second friction member.

14. A truck assembly that is configured to travel along a track having rails, the truck assembly comprising:
a first side frame;
a second side frame;
a bolster extending between the first side frame and the second side frame;
a first wheel set coupled to the first side frame and the second side frame;
a second wheel set coupled to the first side frame and the second side frame;
a first friction assist side bearing assembly coupled to the bolster; and
a second friction assist side bearing assembly coupled to the bolster, wherein the first friction assist side bearing assembly is mounted on a top surface of the bolster between a bolster center bowl and a first end, and wherein the second friction assist side bearing assembly is mounted on the top surface of the bolster between the bolster center bowl and a second end, wherein each of the first friction assist side bearing assembly and the second friction assist side bearing assembly comprises:
a spring bracket that retains a first spring and a second spring;
a friction base that couples to the spring bracket, wherein the friction base comprises opposed first and second side walls that connect to opposed first and second end walls that define a friction chamber, and wherein the friction base is configured to be secured to the bolster;
a first friction member retained by the friction base;
a second friction member that opposes the first friction member, wherein the second friction member is retained by the friction base, wherein the first friction member and the second friction member are disposed within the friction chamber; and
a cap coupled to the first friction member and the second friction member, wherein the cap is configured to contact a portion of a car body coupled to the truck assembly, wherein the cap is frictionally coupled to the first friction member and the second friction member,
wherein the first spring and the second spring exert force between a top surface of the bolster and the spring bracket, wherein the force exerted by the first spring and the second spring is distributed to the first friction member, the second friction member, and the cap.

15. The truck assembly of claim 14, wherein the cap, the first friction member, and the second friction member are configured to move between an extended position and a compressed position to dampen forces between the car body and the truck assembly.

16. The truck assembly of claim 14, wherein the spring bracket comprises:
a first lateral wing connected to an opposite second lateral wing by a central beam, wherein the first lateral wing constrains the first spring, and the second lateral wing constrains the second spring; and
an angled protuberance extending upwardly from the central beam, wherein the angled protuberance couples to the first friction member and the second friction member,
wherein the friction base is disposed over the angled protuberance of the spring bracket between the first lateral wing and the second lateral wing.

17. The truck assembly of claim 14, wherein each of the first friction member and the second friction member comprises:
an upright outer wall;
an upper interior wedge that downwardly and inwardly angles from a top edge of the upright outer wall; and
a lower interior wedge that upwardly and inwardly angles from a lower edge of the upright outer wall,
wherein the upper interior wedge and the lower interior wedge connect at a central band, wherein the central bands of the first friction member and the second friction member face one another,
wherein the lower interior wedges of the first and second friction members bear against opposite angled ramps of an angled protuberance of a spring bracket.

18. The friction assist side bearing assembly of claim 1, wherein the first spring and the second spring are configured to exert force between a bolster and the spring bracket.

19. A friction assist side bearing assembly for a truck assembly of a rail vehicle, the friction assist side bearing assembly comprising:
a spring bracket that retains a first spring and a second spring;

a friction base that couples to the spring bracket, wherein the friction base comprises opposed first and second side walls that connect to opposed first and second end walls that define a friction chamber, and wherein the friction base is configured to be secured to a bolster of the truck assembly;
a first friction member retained by the friction base;
a second friction member that opposes the first friction member, wherein the second friction member is retained by the friction base, wherein the first friction member and the second friction member are disposed within the friction chamber; and
a cap coupled to the first friction member and the second friction member, wherein the cap is configured to contact a portion of a car body coupled to the truck assembly, wherein the cap is frictionally coupled to the first friction member and the second friction member.

20. A friction assist side bearing assembly for a truck assembly of a rail vehicle, the friction assist side bearing assembly comprising:
a spring bracket that retains a first spring and a second spring;
a friction base that couples to the spring bracket, wherein the friction base is disposed over an angled protuberance of the spring bracket between a first lateral wing and a second lateral wing;
a first friction member retained by the friction base;
a second friction member that opposes the first friction member, wherein the second friction member is retained by the friction base; and
a cap coupled to the first friction member and the second friction member, wherein the cap is configured to contact a portion of a car body coupled to the truck assembly, wherein the cap is frictionally coupled to the first friction member and the second friction member.

21. A friction assist side bearing assembly for a truck assembly of a rail vehicle, the friction assist side bearing assembly comprising:
a spring bracket that retains a first spring and a second spring;
a friction base that couples to the spring bracket;
a first friction member retained by the friction base;
a second friction member that opposes the first friction member, wherein the second friction member is retained by the friction base,
wherein each of the first friction member and the second friction member comprises:
an upright outer wall;
an upper interior wedge that downwardly and inwardly angles from a top edge of the upright outer wall; and
a lower interior wedge that upwardly and inwardly angles from a lower edge of the upright outer wall, wherein the lower interior wedges of the first and second friction members bear against opposite angled ramps of an angled protuberance of a spring bracket; and
a cap coupled to the first friction member and the second friction member, wherein the cap is configured to contact a portion of a car body coupled to the truck assembly, wherein the cap is frictionally coupled to the first friction member and the second friction member.

22. A truck assembly that is configured to travel along a track having rails, the truck assembly comprising:
a first side frame;
a second side frame;
a bolster extending between the first side frame and the second side frame;
a first wheel set coupled to the first side frame and the second side frame;
a second wheel set coupled to the first side frame and the second side frame;
a first friction assist side bearing assembly coupled to the bolster; and
a second friction assist side bearing assembly coupled to the bolster, wherein the first friction assist side bearing assembly is mounted on a top surface of the bolster between a bolster center bowl and a first end, and wherein the second friction assist side bearing assembly is mounted on the top surface of the bolster between the bolster center bowl and a second end, wherein each of the first friction assist side bearing assembly and the second friction assist side bearing assembly comprises:
a spring bracket that retains a first spring and a second spring;
a friction base that couples to the spring bracket;
a first friction member retained by the friction base;
a second friction member that opposes the first friction member, wherein the second friction member is retained by the friction base, wherein each of the first friction member and the second friction member comprises: an upright outer wall; an upper interior wedge that downwardly and inwardly angles from a top edge of the upright outer wall; and a lower interior wedge that upwardly and inwardly angles from a lower edge of the upright outer wall, wherein the upper interior wedge and the lower interior wedge connect at a central band, wherein the central bands of the first friction member and the second friction member face one another, wherein the lower interior wedges of the first and second friction members bear against opposite angled ramps of an angled protuberance of a spring bracket; and a cap coupled to the first friction member and the second friction member, wherein the cap is configured to contact a portion of a car body coupled to the truck assembly, wherein the cap is frictionally coupled to the first friction member and the second friction member.

* * * * *